(12) United States Patent
Gacoin et al.

(10) Patent No.: US 11,099,299 B2
(45) Date of Patent: Aug. 24, 2021

(54) OPTICAL ARTICLE PROVIDED IN A FORM SUITABLE FOR DIRECT LAMINATION; METHOD FOR MANUFACTURING AN OPTICAL DEVICE

(71) Applicant: ESSILOR INTERNATIONAL, Charenton-le-Pont (FR)

(72) Inventors: Eric Gacoin, Charenton-le-Pont (FR); Jeanne Marchal, Charenton-le-Pont (FR); Jonathan Saulny, Charenton-le-Pont (FR); Manuela De Sousa, Charenton-le-Pont (FR); Yohann Felten, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 110 days.

(21) Appl. No.: 15/764,424

(22) PCT Filed: Sep. 27, 2016

(86) PCT No.: PCT/EP2016/072956
§ 371 (c)(1),
(2) Date: Mar. 29, 2018

(87) PCT Pub. No.: WO2017/055265
PCT Pub. Date: Apr. 6, 2017

(65) Prior Publication Data
US 2018/0284325 A1    Oct. 4, 2018

(30) Foreign Application Priority Data
Sep. 29, 2015 (EP) .................................... 15306531

(51) Int. Cl.
*B32B 41/00* (2006.01)
*G02B 1/04* (2006.01)
*B29D 11/00* (2006.01)

(52) U.S. Cl.
CPC ........ *G02B 1/041* (2013.01); *B29D 11/00009* (2013.01); *B29D 11/0073* (2013.01);
(Continued)

(58) Field of Classification Search
CPC .............. G02B 1/041; B29D 11/00009; B29D 11/0073; B29D 11/00865; G02C 2202/16
(Continued)

(56) References Cited

U.S. PATENT DOCUMENTS

| 5,107,371 A | 4/1992 | Shibata et al. |
| 2003/0137634 A1 | 7/2003 | Dungar et al. |

(Continued)

FOREIGN PATENT DOCUMENTS

| EP | 2724815 A1 | 4/2014 |
| JP | S 60-3601 | 1/1985 |

(Continued)

OTHER PUBLICATIONS

International Search Report issued in priority Application No. PCT/EP2016/072956, dated Nov. 29, 2016.
(Continued)

*Primary Examiner* — Michael N Orlando
*Assistant Examiner* — Joshel Rivera
(74) *Attorney, Agent, or Firm* — Norton Rose Fulbright US LLP (57) ABSTRACT

An optical article provided in a form suitable for simultaneous lamination of a pressure sensitive adhesive layer and of a thermoplastic film, the said optical article comprising a convex and a concave optical surface, wherein the convex and/or the concave optical surface is a receiving surface intended to receive the pressure sensitive adhesive on which the thermoplastic film is intended to be arranged and wherein the said receiving surface has an arithmetic average profile roughness greater or equal to 0.01 μm and less or
(Continued)

equal to 0.3 μm and/or wherein the said receiving surface has a profile roughness root mean square slope greater or equal to 0.2° and less or equal to 1.2°. A method for manufacturing an optical device using said optical article.

17 Claims, 5 Drawing Sheets

(52) U.S. Cl.
CPC .. *B29D 11/00961* (2013.01); *B29D 11/00865* (2013.01); *G02C 2202/16* (2013.01)

(58) Field of Classification Search
USPC .............. 156/60, 64, 350, 351, 378, 379
See application file for complete search history.

(56) References Cited

U.S. PATENT DOCUMENTS

| | | | |
|---|---|---|---|
| 2008/0030675 A1 | 2/2008 | Dillon | |
| 2008/0314499 A1* | 12/2008 | Begon | B32B 37/00 156/64 |
| 2010/0039708 A1* | 2/2010 | Suzuki | G02B 1/11 359/601 |
| 2013/0200538 A1 | 8/2013 | Erward et al. | |
| 2014/0334000 A1* | 11/2014 | Clerc | B29D 11/0073 359/488.01 |
| 2015/0240031 A1 | 8/2015 | Nakayama | |

FOREIGN PATENT DOCUMENTS

| | | |
|---|---|---|
| JP | S 62-196613 | 8/1987 |
| JP | H 035702 | 1/1991 |
| JP | 2007-226241 | 9/2007 |
| JP | 2008-40497 | 2/2008 |
| JP | 2010-536060 | 11/2010 |
| JP | 2012-008524 | 1/2012 |
| JP | 2014-48242 | 3/2014 |
| WO | WO 2006/105999 | 10/2006 |
| WO | WO 2009/019276 | 2/2009 |

OTHER PUBLICATIONS

Office Action Issued in Corresponding Japanese Patent Application No. 2018-535241, dated Aug. 11, 2020.

* cited by examiner

OPTICAL ARTICLE PROVIDED IN A FORM SUITABLE FOR DIRECT LAMINATION; METHOD FOR MANUFACTURING AN OPTICAL DEVICE

CROSS-REFERENCE TO RELATED APPLICATIONS

This application is a national phase application under 35 U.S.C. § 371 of International Application No. PCT/EP2016/072956 filed 27 Sep. 2016, which claims priority to European Patent Application No. 15306531.3 filed 29 Sep. 2015. The entire contents of each of the abovereferenced disclosures is specifically incorporated by reference herein without disclaimer.

The invention relates generally to the field of optical articles, such as for example spectacle lenses. More specifically, it relates to an optical article provided in a form suitable for direct lamination. It also relates to a method for manufacturing an optical device using said optical article.

Optical articles involve the behaviour and properties of light, as for example of the visible light. An optical article comprises at least one optical surface and the light path results from interactions of the light with at least said optical surface. An optical article may comprise a plurality of optical surfaces and the light path results from interactions of the light with the optical surfaces and with the material (or the plurality of material) separating said optical surfaces.

Among optical articles, lenses are widely used. A lens is a transmissive optical article that affects the focus of a light beam through refraction. Spectacle lenses are lenses consisting of a single piece of material.

There is a need for providing layers on an optical surface of an optical article. Said layers are designed to enhance the performance of the optical article. They may for example modify the surface quality of the optical surface, change the colour of the optical article, protect it against abrasion, add an antireflective function, and be a substrate for adding further layers and or coatings.

There is thus a need for providing optical article that are in a form suitable for receiving at least a layer.

For this purpose, an object of the invention is an optical article provided in a form suitable for simultaneous lamination of a pressure sensitive adhesive layer and of a thermoplastic film, the said optical article comprising a convex and a concave optical surface facing each other, wherein the convex and/or the concave optical surface(s) is (are) a ( ) receiving surface(s) intended to receive the pressure sensitive adhesive on which the thermoplastic film is intended to be arranged and wherein the said receiving surface has an arithmetic average profile roughness, Ra, greater or equal to 0.01 µm and less or equal to 0.3 µm and/or wherein the said receiving surface has a profile roughness root mean square slope, Rdq, greater or equal to 0.2° and less or equal to 1.2°.

Conditions "a receiving surface has an arithmetic average profile roughness, Ra, greater or equal to 0.01 µm and less or equal to 0.3 µm and/or wherein the said receiving surface has a profile roughness root mean square slope, Rdq, greater or equal to 0.2° and less or equal to 1.2°" are here after called "selected roughness features". In an embodiment, the arithmetic average profile roughness Ra, is greater or equal to 0.02 µm or even greater than 0.03 µm.

According to an embodiment, the selected roughness features are following: a receiving surface has an arithmetic average profile roughness, Ra, greater or equal to 0.01 µm and less or equal to 0.3 µm;

According to another embodiment, that can be combined with previous one, the selected roughness features are following: a receiving surface has a profile roughness root mean square slope, Rdq, greater or equal to 0.2° and less or equal to 1.2°.

The inventors have demonstrated that the selected roughness features are suitable for obtaining enhanced features after laminating a pressure sensitive adhesive layer and a thermoplastic film directly on a receiving surface of the optical article.

An optical article of the present invention is thus advantageous for further manufacturing an optical device, as for example, when a pressure sensitive adhesive layer is adhered on the receiving surface of the said optical article and a thermoplastic film is arranged on the pressure sensitive adhesive layer.

According to the present invention, an optical article comprises a convex and a concave optical surface facing each other and being separated by a material. According to an embodiment, said material is a transparent material.

According to usual definitions:
The arithmetic average profile roughness, Ra, is an amplitude parameter that characterizes a surface based on the vertical deviations of the roughness profile from a mean line. The arithmetic average profile roughness, Ra, is the arithmetic average of the absolute values of roughness profile ordinates;

The roughness root mean square slope, Rdq, is a slope parameter that describes characteristics of the slope of a roughness profile.

The roughness root mean square slope, Rdq, is the root mean square slope of the profile within a sampling length.

According to different embodiments of the optical article of the present invention, that may be combined according to all technically valuable embodiments:

the pressure sensitive adhesive layer and of the thermoplastic film intended to be simultaneously laminated are in the form of a multi-layered film where the pressure sensitive adhesive layer is arranged on the thermoplastic film;

the receiving surface has a mean spacing between peaks, called RSM, according to following equation:

$$RSM \geq \min(0.64 \times Ra; 0.58 \times Ra + 0.007);$$

and wherein «min (x; y)» refers to the choice of the lowest value between x and y;

the receiving surface has a mean spacing between peaks, called RSM, according to following equation: $RSM \geq 0.64 \times Ra$, the receiving surface has a mean spacing between peaks, called RSM, according to following equation: $RSM \geq 0.58 \times Ra + 0.007$.

The present invention is also directed to an optical device comprising an optical article having the selected roughness features, a pressure sensitive adhesive layer and a thermoplastic film, and where the pressure sensitive adhesive layer is adhered on a receiving surface of the optical article and the thermoplastic film is arranged on the pressure sensitive adhesive layer thanks to simultaneous lamination.

It has to be understood that after being simultaneous laminated, a pressure sensitive adhesive layer and a thermoplastic film cannot be separated.

According to an embodiment, the thickness of the pressure sensitive adhesive layer is greater or equal to 20 µm and less or equal to 250 µm, for example greater or equal to 25 µm and/or less or equal to 75 µm. According to an embodiment, the thickness of the thermoplastic film is greater or equal to 30 μm and less or equal to 500 μm, for example greater or equal to 80 μm and/or less or equal to 200 μm.

The present invention is also directed to a method for manufacturing an optical device comprising following steps:
- providing an optical article having the selected roughness features;
- providing a pressure sensitive adhesive layer and a thermoplastic film;
- laminating the pressure sensitive adhesive layer and the thermoplastic film directly on a receiving surface of the optical article so as the pressure sensitive adhesive adheres on said receiving surface and so as the thermoplastic film is arranged on the pressure sensitive adhesive.

According to different embodiments of the method for manufacturing of the present invention, that may be combined according to all technically valuable embodiments:
- the provided pressure sensitive adhesive and thermoplastic films are in the form of a multi-layered film where the pressure sensitive adhesive layer is arranged on the thermoplastic film;
- the thermoplastic film is a part of a structured film that further comprises a coating, said coating being preferentially arranged on a face of the thermoplastic film opposite to another face of the thermoplastic film intended to be in contact with the pressure sensitive adhesive layer; even if in some case, a coating can be present in-between the thermoplastic film and the pressure sensitive layer; wherein said coating is chosen within the list consisting of a thermoplastic film, a hard coat layer, a primer layer, a photochromic layer, a polarized layer, a liquid crystal-layer, an electro-chromic layer, an anti-static layer, an interferential stack, such as an anti-reflective layer, a mirror or a reflective layer or layer reflective on a partial part of the visible spectrum, a tinted layer, a selective filter for filtering one or more wavelength ranges, an anti-smudge layer, an anti-fog layer, an anti-rain layer, a hydrophobic layer or a combination thereof;
- the said method for manufacturing further comprises a step of providing at least a supplementary layer on a surface of the optical device where a pressure sensitive adhesive layer and a thermoplastic film have previously been laminated, wherein said at least one supplementary layer is chosen within the list consisting of a thermoplastic film, a hard coat layer, a primer layer, a photochromic layer, a polarized layer, a liquid crystal-layer, an electro-chromic layer, an anti-static layer, an interferential stack, such as an anti-reflective layer, a mirror or a reflective layer or layer reflective on a partial part of the visible spectrum, a tinted layer, a selective filter for filtering one or more wavelength ranges, an anti-smudge layer, an anti-fog layer, an anti-rain layer, a hydrophobic layer or a combination thereof;
- the said method for manufacturing in which the thermoplastic film is a part of a structured film that further comprises a coating, and the method further comprises a step of providing at least a supplementary layer on a surface of the optical device where a pressure sensitive adhesive layer and a thermoplastic film have previously been laminated;
- the said method for manufacturing, in which, either the thermoplastic film or the pressure sensitive layer comprises a further optical property, by addition or presence of at least a dye, a pigment, an absorber, a photochromic dye;
- the optical article is previously manufactured from a semi-finished optical article to provide a receiving surface thanks to a machining process of the semi-finished optical article which comprises at least one of roughing step and a fining step, and no more than two steps selected from a roughing step, a fining step and a roughness erasing step; according to an embodiment, the machining process of the semi-finished optical article only comprises a roughness erasing step; according to an embodiment, the machining process of the semi-finished optical article only comprises a roughing step;
- the said method for manufacturing comprises a preliminary step of providing a supplied optical article comprising a convex and a concave optical surface facing each other, followed by a control step and by a decision making step wherein:
  - the control step comprises determining the roughness of a surface of the supplied optical article which is intended to be a receiving surface;
  - the decision making step comprising following sub steps:
    i. comparing the previously determined roughness of said optical surface to the one of a receiving surface of an optical article having the selected roughness features;
    ii. providing the supplied optical article to the providing step of the method for manufacturing if the roughness requirements corresponding to the selected roughness features are fulfilled and providing the supplied optical article to a complementary step if the roughness requirements corresponding to the selected roughness features are not fulfilled.
- determining the roughness of a surface which is intended to be a receiving surface is implemented according to a method chosen in the list consisting of measuring the roughness of said surface; deducing the roughness of said surface on the basis of previous manufacturing data of said surface; comparing said surface with a surface of known roughness;
- the complementary step is chosen within the list of rejecting the supplied optical article and further machining the surface which is intended to be a receiving surface so that the roughness of said surface fulfils the selected roughness features after said machining step in order to provide the supplied optical article to the providing step of the method for manufacturing; according to an embodiment, further machining the surface which is intended to be a receiving surface consists of a flash polishing step.

Examples will now be described with reference to the accompanying drawings wherein.

Elements in the figures are illustrated for simplicity and clarity and have not necessarily been drawn to scale. For example, the dimensions of some of the elements in the figure may be exaggerated relative to other elements to help improve the understanding of the embodiments of the present invention.

In the figures, the same numeral references correspond to the same parts.

Figure 1:
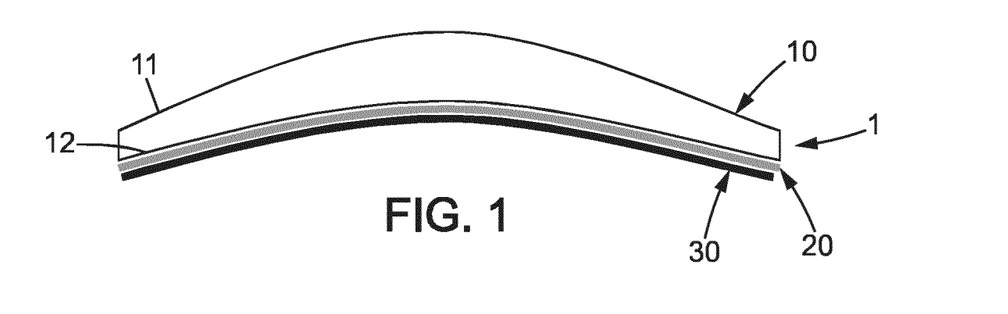
FIG. 1 shows an optical device comprising an optical article, a pressure sensitive adhesive layer and a thermoplastic film.

FIG. 1 shows an optical device 1 comprising an optical article 10, a pressure sensitive adhesive layer 20 and a thermoplastic film 30. Said optical article 10 comprises a convex optical surface 11 and a concave optical surface 12 facing each other. According to an example, the optical device 1 is an ophthalmic spectacle lens.

According to the wording of the present invention, "film", when used alone, refers to single layer of material. According to an example, a film is a functional film; according to an example, a film is self-supporting.

According to an example, the thermoplastic film 30 is cellulose triacetate (TAC) film.

According to an example, the pressure sensitive adhesive layer 20 and the thermoplastic film 30 are assembled as a multi-layered film. In the frame of the invention, "multi-layered film" refers to a pressure sensitive adhesive layer and a thermoplastic film which are parts of a unique stratified structure and where the pressure sensitive adhesive layer is arranged on the thermoplastic film.

According to the wording of the present invention, "structured film" refers to a plurality of films or layers of material that are part of a stratified structure. According to an example, a structured film is a stratified structure comprising a first film of material and one or more individual film layer(s) having identical or different characteristic that are adhered together or additional layers having identical or different characteristics, while not being self-supporting by themselves. According to an embodiment of the present invention, the thermoplastic film is a part of a structured film that further comprises a coating, said coating being preferentially arranged on a face of the thermoplastic film opposite to another face of the thermoplastic film intended to be in contact with the pressure sensitive adhesive layer.

Optical articles, such as lenses, are made from materials, such as for example glass or plastic material, which are shaped to a desired shape, and are for example moulded and/or ground and/or polished. According to an embodiment, said material is a transparent material.

According to an embodiment, an optical article, such as a lens, is machined from a blank, also called a "semi-finished" product. A blank for a lens, namely for a spectacle lens, can be for example a "thick lens" with a completed front surface, but a back surface which still needs to be worked, (also known as "surfaced"), through a process usually known as "surfacing", so as to obtain optical specifications, such as prescription specifications for a wearer. It can also be a "thick lens" where both front surface and back surface are to be worked (or surfaced) so as to obtain optical specifications.

Surfacing of an optical surface can be implemented thanks to one or several of following commonly used machining steps:
  "roughing" which consists of milling the material of the optical article with a diamond wheel or a blade to give it its desired thickness and radii of curvature. After roughing, the optical surface has acquired its almost definitive shape, but still has a rough, translucent surface; roughing can be done using at least one of the following methods:
    "grinding" which consists of grind the material of the optical article with an abrasive wheel (usually made of bonded micro-particles of diamond) to give it its desired thickness and radii of curvature;
    "milling" which consists to remove the material of the optical article with a rotationally driven cutting tool to give it its desired thickness and radii of curvature.
  "fining" also called "smoothing" or "fine-cutting" which consists of refining the grain of an optical surface without modifying its radii of curvature. It consists in removing the excess material so as to give its desired thickness and radii of curvature to the lens with adequate surface properties: sub-surface damages of less than micron-level, low waviness of the defects. According to an embodiment, the firmly held optical article is brought into contact with a tool which has been fitted with an abrasive pad or disk, the radius of curvature of the tool being identical to that of the sought lens. The optical article and tool are set in motion and cooled down with a lubricant solution. According to another embodiment, a mono-crystal diamond blade can be used to mill the surface in a lathing operation, such as shown in EP 2 724 815 A1, with a finer pace than during roughing step. At the end of the fining operation, which lasts a few minutes, the optical article has the exact thickness and curvature required so that the shape of the surface is roughly equal to the one that would bring out the optical correction determined for the optical article, but the surface is not yet perfectly smooth and transparent. Depending on the process, the fining step can comprise one or more sub-steps;
  roughness erasing step, also called "polishing", is a finishing operation which is used to give transparency to an optical article. This operation enables to eliminate traces from the roughing and finishing step, smoothing the grooves formed by the diamond blades. It consists in removing a few micrometers of material on the whole surface to remove sub-surface damages and filters the residual fine-cutting waviness and roughness. This stage consists in applying a relative movement between the surface and a soft polishing tool which is adapted to conform itself to the surface in an abrasive environment (slurry containing micron level abrasive grains). Accordingly it often uses a soft polishing disk and abrasive solution with a very fine grain and is thus often known as "soft polishing step". The soft polishing step does not enable to modify the curvature of the polished surface. Said in another way it cannot impact the shape of the surface at the wavelength that define an optical function of the surface of the optical article.

Current optical surfaces are frequently manufactured by successively implementing the three here above machining steps. Nevertheless other manufacturing methods may be implemented.

In FIG. 1, the concave optical surface 12 is provided with a pressure sensitive adhesive layer 20 contacting said surface and a thermoplastic film 30 arranged on the pressure sensitive adhesive layer. In the frame of the present invention, optical surface 12 is called a "receiving surface" because it is intended to receive the pressure sensitive adhesive on which the thermoplastic film is intended to be arranged. The pressure sensitive adhesive layer 20 and a thermoplastic film 30 are laminated on the receiving surface 12.

Lamination is a well-known technique of manufacturing a part comprising layers bonded together. It thus includes transfer and gluing said layers onto a surface so that to form them on said surface. Lamination can be obtained thanks to compressing or rolling the layers together. Pressure is applied on the layers during the lamination step. Patent application WO 2006/105999 discloses an apparatus for laminating a film onto an ophthalmic lens which may be suitable to implement the present invention. According to an example, pressure on the layers is greater or equal to 1 bar, as for an example pressure is comprised between 2 bars and 3 bars; according to an example, pressure is applied on the layers for a time period comprised between 30 seconds and 2 minutes.

Pressure-sensitive adhesive, also called "PSA", are known in the field of optical devices to arrange a film onto a surface of an optical article while preserving the dioptric properties of the optical article. It is noteworthy that the mechanism of adhesion involved in this type of adhesive material does not involve chemical bonding but exploits the particular viscoelastic properties of the PSA material. These properties that are intrinsic to each PSA formulation make it possible to establish Van der Waals electrostatic interactions at the interface of adhesion. This is what is produced when the PSA is placed in contact with a solid material with the application of pressure.

Several pressure-sensitive adhesive materials may be used. Advantageously, the pressure-sensitive adhesive material that is used is chosen from the group comprising a polyacrylate base, a styrene based copolymer, and a mixture comprising a natural rubber. More particularly, the following may be mentioned by way of non-limiting example: the PSAs having a general composition based on polyacrylates, polymethacrylates; ethylenic copolymer based such as the ethylene vinyl acetates, ethylene ethyl acrylates, ethylene ethyl methacrylates; the PSAs having a base of synthetic rubber and elastomers, including the silicones, the polyurethanes, the butadiene styrenes, the polybutadienes, the polyisoprenes, the polypropylenes, the polyisobutylenes; the PSAs based on polymers comprising the nitrites or acrylonitriles; the PSAs based on polychloroprene; the PSAs based on block copolymers comprising polystyrene, polyethylene, polypropylene, polyisoprene, polybutadiene; the PSAs base on polyvinylpyrrolidone and vinylpyrrolidone copolymers as well as the compositions or mixtures (of continuous or discontinuous phases) of the aforegoing, as well as the block copolymers obtained using the aforegoing. These PSAs can also include in their formulation one or a plurality of additives chosen particularly from among the tackifiers, the plasticizers, the bonders, the antioxidants, the stabilizers, the pigments, the colorants, the dispersing agents, and the diffusers. According to an embodiment of the present invention, acrylic-based PSAs are preferred.

Thermoplastic, also called "thermosoftening plastic", is, in the frame of the present invention, a plastic material (polymer) that becomes moldable above a specific temperature and solidifies upon cooling. The polymer chains associate through intermolecular forces, which weaken rapidly with increased temperature, yielding a viscous liquid. Thus, thermoplastics may be reshaped by heating. The following may be mentioned by way of non-limiting example of thermoplastics: poly(methyl methacrylate) (PMMA), acrylonitrile butadiene styrene (ABS), polyamides, polylactic acid (polylactide), polybenzimidazole (PBI), polycarbonate (PC), polyether sulfone (PES), polyetherether ketone (PEEK), polyetherimide (PEI), polyethylene (PE), polyphenylene oxide (PPO), polyphenylene sulfide (PPS), polypropylene (PP), polystyrene (PS), polyvinyl chloride (PVC), polytetrafluoroethylene (PTFE), cellulose triacetate (TAC), cellulose acetate butyrate (CAB), poly(ethylene terephthalate) (PET), polyurethane (PU/TPU), cyclo-olefin copolymer (COC) and Polyimides. Preferentially, the thermoplastic film of the invention is chosen in the following list: polycarbonate (PC), poly(methyl methacrylate) (PMMA), polyethylene (PE), cellulose triacetate (TAC), poly(ethylene terephthalate) (PET), polyurethane (PU/TPU) and cyclo-olefin copolymer (COC).

The pressure sensitive adhesive layer and the thermoplastic film can be provided separately or in the form of a multi-layered film.

The thermoplastic film can be a part of a structured film that further comprises a coating, said coating being arranged on a face of the thermoplastic film opposite to another face of the thermoplastic film arranged on the pressure sensitive adhesive layer.

The thermoplastic film is thin, i.e. less than 1 mm, and generally thinner than 500 μm, more preferably thinner than 300 μm. The thermoplastic film, in the case of the present invention, can be a plane film, or can comprise a part which is curved so as to form a pseudo-spherical calotte, which can also be called a dome. Further, the thermoplastic film may rigid enough so as to be self-supporting.

Figure 2:
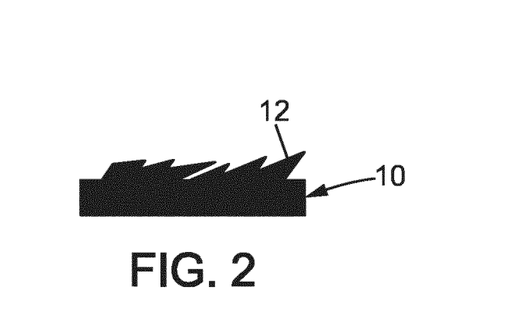
FIGS. 2 and 3 show details of surfaces of FIG. 1.

FIG. 2 shows a detailed view of an optical surface after roughing. Said surface comprises numerous irregularities 12 and thus has a significant roughness.

Figure 3:
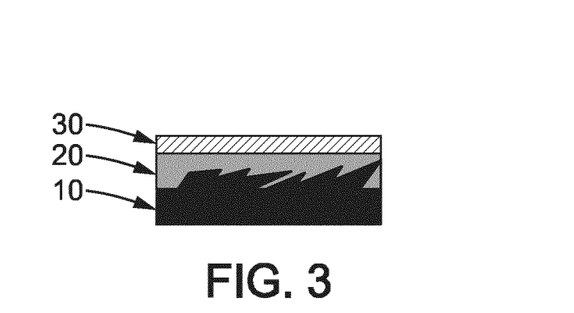

FIG. 3 shows a detailed view of an optical surface of an optical article 10 on which a pressure sensitive adhesive layer 20 and of a thermoplastic film 30 have been laminated when the method for manufacturing an optical device according to the present invention has been used. One can see that pressure sensitive adhesive material has been able to flow around the surface irregularities and to offer a continuous medium with very little void, even with no void. The inventors have demonstrated that good optical properties are obtained when the optical device presents such a configuration.

To determine conditions where said configuration can be obtained, the inventors have performed a plurality of experiments.

Said experiments have been performed by using spectacle lenses.

Transparency of a spectacle lens is a relevant quality index of such a lens.

An optical component is considered to be transparent when the observation of an image through this component is perceived without significant loss of contrast. Stated otherwise, the inter-position of a transparent optical component between an image and an observer of the latter does not significantly reduce the quality of the image. This definition of the term transparent is applicable, within the meaning of the invention, to all the objects regarded as such in the description. In a particular case this definition is considered as met if the optical article has an haze lower than about 1.

Further, notwithstanding the haze value, an optical device needs to have a sufficient optical quality.

A method has been used to characterize optical quality of samples. Said method is a transmission method and the optical quality of samples is measured by a trained observer according to a protocol.

Figure 4:
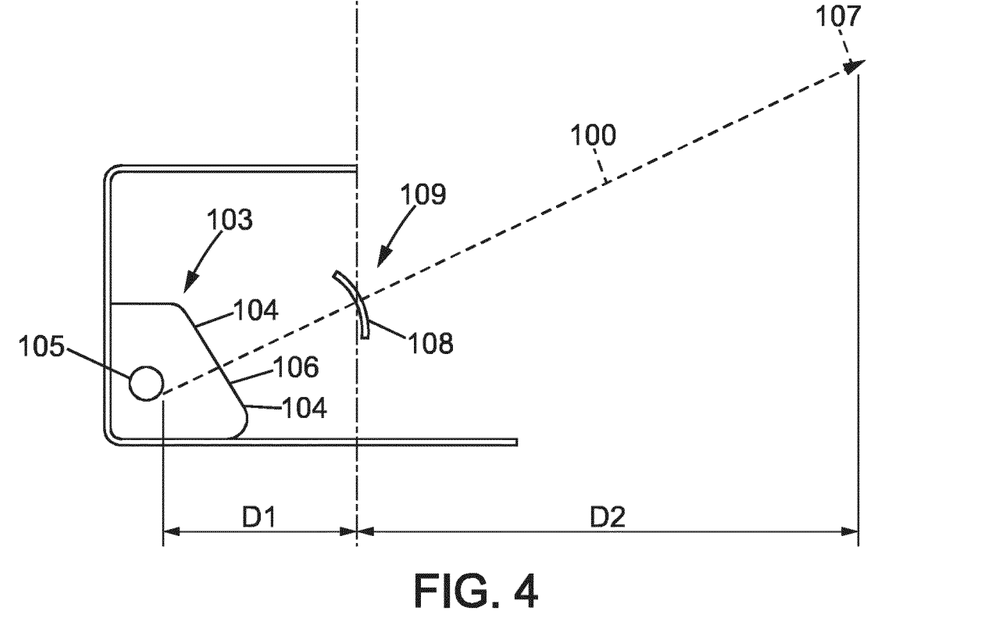
FIGS. 4 and 5 show a device suitable for determining the optical quality of an optical device.
Figure 5:
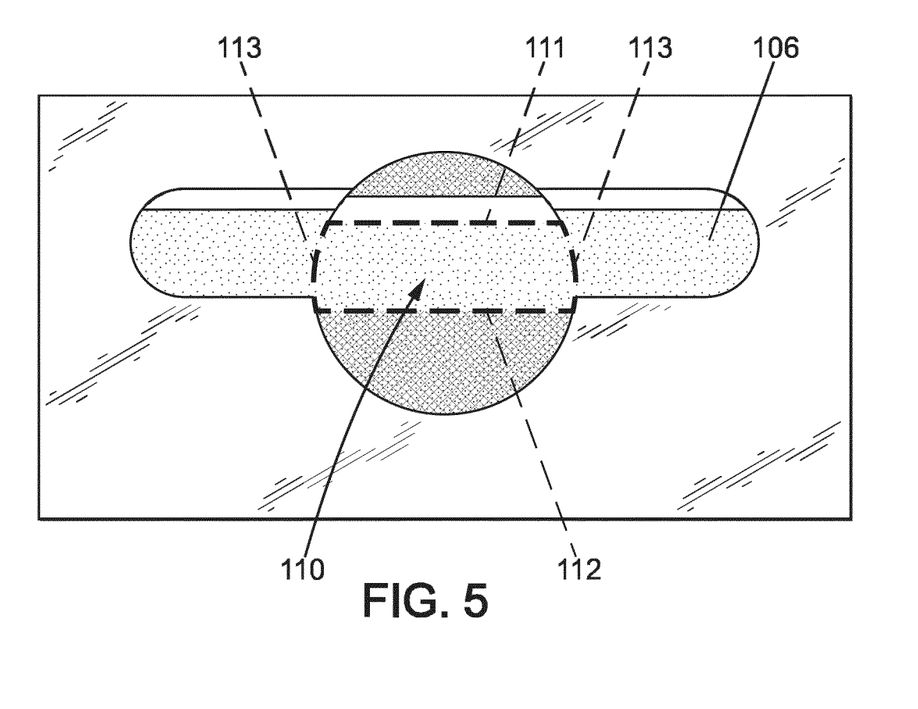

FIGS. 4 & 5 show the first optical quality device and how to use it to determine the optical quality of transparent samples. Said device comprises a box 103 with opaque walls 104 and including an elongated light source 105. A front wall comprises an elongated slit 106, arranged parallel to the light source. The light source is shifted from the slit so as not to be seen by an observer 107 facing the slit and looking according to direction 100. A sample to be measured, for example a lens 108, is placed in an observation zone 109 so as to face the slit 106 and so as it optical axis is parallel to direction 100. Distance D1 between the light source and the sample is 200 mm. Distance D2 between the sample and the eyes of the observer is 500 mm. Ambient light is tuned between 60 and 130 lux. Light in observation zone 109, mainly due to light source 105, is tuned between 600 and 1200 lux. The trained observer is chosen with a 10/10 vision for each eye. In his observation position, he sees the lens according to FIG. 5. He can see an inspection zone 110 which is for example about a third of the surface of lens 108. The inspection zone 110 is delimited by the edge 111 of light source 105 as seen through lens 108 and by the edge 112 of slit 106 as seen through lens 108. The lens is translated so as its all surface successively appears the inspection zone 110. The trained observer observes the lens surface during a determined period of time and indicates if he can see an optical defect, for example a surface heterogeneity, a scratch.

The trained observer firstly observes the sample at day light, uses then the first optical quality device and finally the second optical quality device. He stops his observation when optical defect(s) is(are) observed.

Marks are given according to following protocol:
Mark=2, when one (or several) optical defect(s) is (are) observed after observing the sample with the optical quality device during the time period equal or less to 5 seconds. Example of defects: distortion circle, haze circle, scratches
Mark=1, when one (or several) optical defect(s) is(are) observed after observing the sample with the quality device during the time period more than to 5 seconds and equal or less to 20 seconds. Example of defects: distortion circle, haze circle, scratches
Mark=0, when no optical defect is observed after observing the sample with the optical quality device.

Results where Mark=1 are considered as acceptable results; results where Mark=0 are considered as good results. Samples with results both with Mark=0 and Mark=1 are considered as having satisfactory optical quality.

137 lens samples of different substrate material have been prepared so as to obtain a plurality of roughness on a receiving surface; a pressure sensitive adhesive layer and of a thermoplastic film have then been laminated on said receiving surface so as to provide 137 lens optical devices of optical power varying between 0.00 D and −2.00 D. Optical quality of the resulting lens optical devices has been measured according to preceding protocol.

In those embodiments, the pressure sensitive adhesive layer is provided as being part of a pressure sensitive film adhesive which commercial reference is 3M™ Optically Clear Adhesive 8146-X; the pressure sensitive film adhesive comprises the pressure sensitive adhesive layer and a peelable protective thermoplastic film; the pressure sensitive adhesive layer is an acrylic polymer present on the protective thermoplastic film; the pressure sensitive adhesive layer is arranged on the receiving surface of the optical device and the protective thermoplastic film is removed. The thermoplastic film of the optical device is then applied on the pressure sensitive adhesive layer. The thermoplastic film of the optical device is a cellulose triacetate (TAC) film, commercialized by Fuji Company, under reference SZ80.

Roughness of the receiving surface has been measured thanks to a Form TalySurf (FTS) stylus instrument commercialized by Taylor Hobson Company. The stylus has a 2 μm diamond point and is moved on the receiving surface at a 1 mm/s speed with a constant pressure. It is estimated that the measurement error is +/−2 nm.

Analysis of the data has made clear that the only parameter that significantly influences the optical quality is the roughness of the receiving surface when the film used remains identical. Variation of refractive index of the lens material does not have a significant impact on the optical quality when the roughness is similar from a lens sample to another.

It has been demonstrated that simultaneous lamination of a pressure sensitive adhesive layer and of a thermoplastic film is suitable for obtaining good optical qualities of samples when implemented according to the teaching of the present invention.

It has been demonstrated that excellent results are obtained when the thickness of the pressure sensitive adhesive layer is greater or equal to 20 μm and less or equal to 250 μm, and even preferably greater or equal to 25 μm and/or less or equal to 75 μm.

Figure 6:
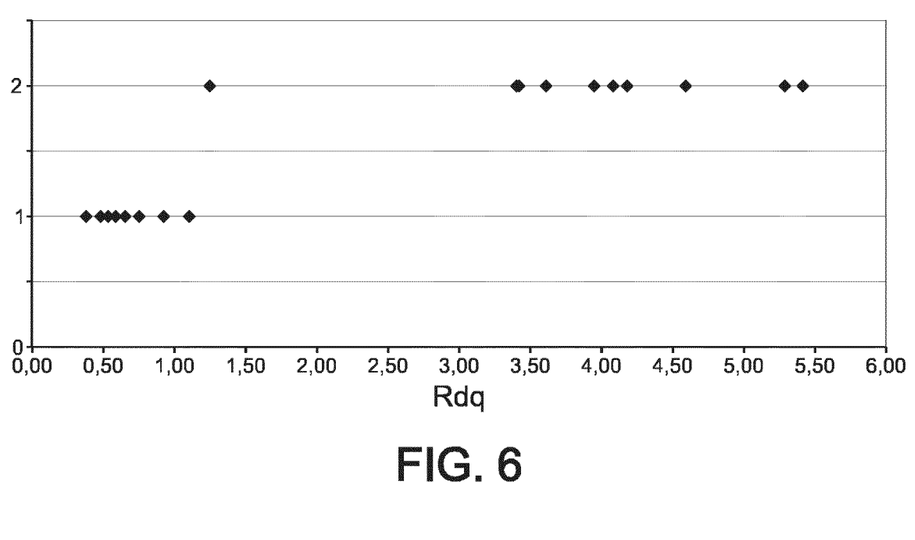
FIG. 6 shows variation of measured optical quality of optical devices according to a roughness feature.

FIG. 6 shows variation of measured optical quality of lens optical devices according to measured profile roughness root mean square slope of samples, $R_{dq}$. Measured optical qualities (in ordinate) are indicated according to here above recited mark numbering. One can clearly see that acceptable results (Mark=1) are obtained when the receiving surfaces have a profile roughness root mean square slope, $R_{dq}$, less or equal to 1.2° and that results are not acceptable when $R_{dq}$ is greater to 1.2° (Mark=2).

The inventors have thus selected a roughness feature range where excellent optical quality can be achieved when manufacturing an optical device comprising an optical article with a receiving surface according to said features on which a pressure sensitive adhesive layer and a thermoplastic film are directly laminated.

Figure 7:
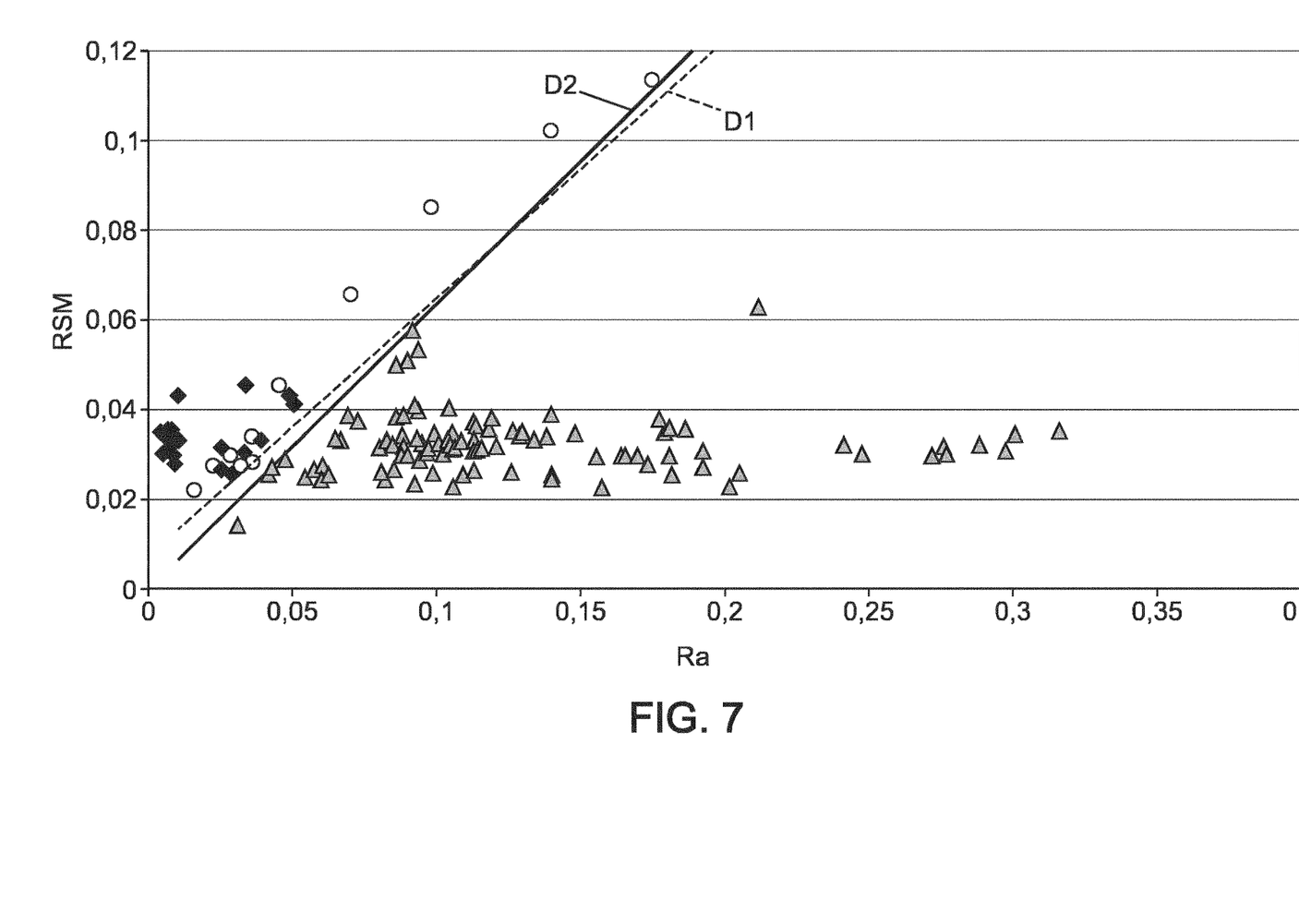
FIGS. 7 and 8 show the influence of roughness features on the measured optical quality of optical devices.
Figure 8:
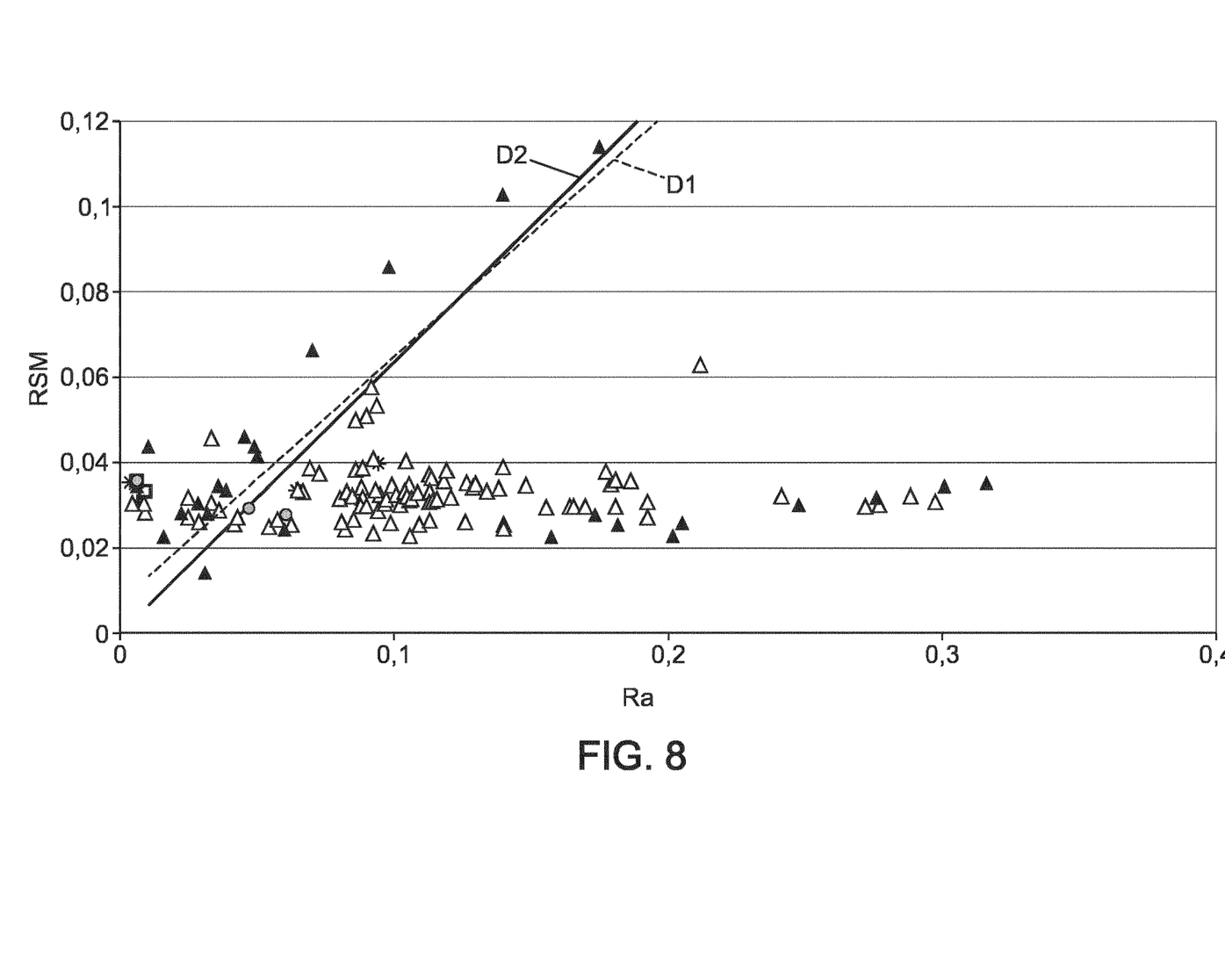

FIGS. 7 and 8 show the influence of roughness features of receiving surfaces on the measured optical quality of optical devices that have been manufactured as here above recited. In the graphs of those figures, arithmetic average profile roughness, Ra, is indicated in abscissa, and mean spacing between peaks, called RSM, is indicated in ordinate.

Experimental data are plotted in the (arithmetic average profile roughness, mean spacing between peaks) referential of FIGS. 7 and 8 and only the presentation of information varies between FIG. 7 and FIG. 8.

In FIG. 7, data are shown when using three distinctive signs where:
Black squares on edge refer to samples with good measured optical qualities (Mark=0);
Circles refer to samples with acceptable measured optical qualities (Mark=1);
Grey triangles refer to samples with non acceptable measured optical qualities (Mark=2).

The inventors have discovered that a relationship exists between the arithmetic average profile roughnesses and the mean spacings between peaks that permit choosing roughness features of the receiving surface that allow obtaining satisfactory optical quality.

It has been demonstrated that samples where requirements of following equation are fulfilled, $$RSM \geq \min(0.64 \times Ra; 0.58 \times Ra + 0.007),$$

are samples with satisfactory optical quality.

On FIG. 7:
straight dotted line D1 corresponds to following equation:

$$RSM = 0.58 \times Ra + 0.007;$$

straight full line D2 corresponds to following equation:

$$RSM = 0.64 \times Ra.$$

Same data are plotted on FIG. 8 and same lines D1 and D2 are reported; the data are shown when using five distinctive signs where:
- squares refer to samples where the optical article has a refractive index of 1.67;
- light triangles refer to samples where the optical article has a refractive index of 1.59;
- stars refer to samples where the optical article has a refractive index of 1.53;
- grey circles refer to samples where the optical article has a refractive index of 1.56;
- black triangles refer to samples where the optical article has a refractive index of 1.49;

Those data clearly demonstrate that the nature of the optical article do not play a role when determining the relationship between the arithmetic average profile roughnesses and the mean spacings between peaks that permit choosing roughness features of the receiving surface that allow obtaining satisfactory optical quality.

Thanks to the selected roughness features of the invention, the inventors have demonstrated that one can surprisingly obtain an optical device with good, even with excellent optical quality, where the optical device comprises an optical article comprising a convex and/or a concave receiving surface, a pressure sensitive adhesive layer and a thermoplastic film directly laminated on the receiving surface and wherein the roughness of said receiving surface is significantly higher than the roughness of an usual polished receiving surface, where Rdq<0.2° or Ra<0.1 μm.

One can accordingly use an optical article which receiving surface has been surfaced with no more than two of a roughing step, a fining step and a polishing step.

It is also possible to use an optical article which receiving surface has been surfaced with only a roughing step.

One can thus use an optical article according to the present invention to save machining steps when surfacing a receiving surface and still obtain good, even excellent optical quality of an optical device according to the present invention.

The method for manufacturing an optical device of the present invention can thus be very cost effective.

Said method can be implemented with numerous substeps as here above mentioned.

Among them, one can implement a preliminary step of providing a supplied optical article comprising a convex and a concave optical surface facing each other, followed by a control step and by a decision making step wherein:
- the control step comprises determining the roughness of a surface of the supplied optical article which is intended to be a receiving surface;
- the decision making step comprising following sub steps:
  i. comparing the previously determined roughness of said optical surface to the one of a receiving surface of an optical article having the selected roughness features;
  ii. providing the supplied optical article to the providing step of the method for manufacturing if the roughness requirements corresponding to the selected roughness features are fulfilled and providing the supplied optical article to a complementary step if the roughness requirements corresponding to the selected roughness features are not fulfilled.

Determining the roughness of a surface which is intended to be a receiving surface can for example be implemented according to a method chosen in the list consisting of measuring the roughness of said surface; deducing the roughness of said surface on the basis of previous manufacturing data of said surface; comparing said surface with a surface of known roughness.

The complementary step can be a step similar to the fining or polishing steps described above.

The invention claimed is:

1. An optical article provided in a form suitable for simultaneous lamination of a pressure sensitive adhesive layer and of a thermoplastic film, the said optical article comprising a convex and a concave optical surface facing each other, wherein the convex and/or the concave optical surface(s) is (are) a receiving surface(s) intended to receive the pressure sensitive adhesive on which the thermoplastic film is intended to be arranged and wherein the said receiving surface has an arithmetic average profile roughness, Ra, greater or equal to 0.01 μm and less or equal to 0.3 μm and/or wherein the said receiving surface has a profile roughness root mean square slope, Rdq, greater or equal to 0.2° and less or equal to 1.2°.

2. The optical article as claimed in claim 1, wherein the pressure sensitive adhesive layer and of the thermoplastic film intended to be simultaneously laminated are in the form of a multi-layered film where the pressure sensitive adhesive layer is arranged on the thermoplastic film.

3. The optical article as claimed in claim 1 wherein the receiving surface has a mean spacing between peaks, called RSM, according to following equation:

$$RSM \gtrsim \min(0.64 \times Ra; 0.58 \times Ra + 0.007).$$

4. An optical device comprising an optical article as claimed in claim 1, a pressure sensitive adhesive layer and a thermoplastic film, wherein the pressure sensitive adhesive layer is adhered on the receiving surface of the optical article and the thermoplastic film is arranged on the pressure sensitive adhesive layer thanks to simultaneous lamination.

5. The optical device as claimed in claim 4, wherein the thickness of the pressure sensitive adhesive layer is greater than or equal to 20 μm and less than or equal to 250 μm, and the thickness of the thermoplastic film is greater than or equal to 30 μm and less than or equal to 500 μm.

6. A method for manufacturing a spectacle lens comprising:
- providing a spectacle lens in a form suitable for simultaneous lamination of a pressure sensitive adhesive layer and of a thermoplastic film, the spectacle lens comprising a convex and a concave optical surface facing each other,
wherein:
  - the convex and/or the concave optical surface(s) is (are) a receiving surface(s) adapted to receive the pressure sensitive adhesive on which the thermoplastic film is intended to be arranged;
  - the receiving surface having an arithmetic average profile roughness, Ra, greater or equal to 0.01 μm and less or equal to 0.3 μm; and/or
  - the receiving surface having a profile roughness root mean square slope, Rdq, greater or equal to 0.2° and less or equal to 1.2°; and
  - the receiving surface having a mean spacing between peaks, called RSM, according to the following equation:

$$RSM \gtrsim \min(0.64 \times Ra; 0.58 \times Ra + 0.007),$$

- providing a pressure sensitive adhesive layer and a thermoplastic film; and
- laminating the pressure sensitive adhesive layer and the thermoplastic film directly on the receiving surface so as the pressure sensitive adhesive adheres on said receiving surface and so as the thermoplastic film is arranged on the pressure sensitive adhesive.

7. The method for manufacturing as claimed in claim 6, wherein the provided pressure sensitive adhesive layer and thermoplastic film are in the form of a multi-layered film where the pressure sensitive adhesive layer is arranged on the thermoplastic film.

8. The method for manufacturing as claimed in claim 6, wherein the thermoplastic film is a part of a structured film that further comprises a coating, said coating being arranged on a face of the thermoplastic film.

9. The method for manufacturing as claimed in claim 6, wherein the said method for manufacturing further comprises a step of providing at least a supplementary layer on a surface of the optical device where a pressure sensitive adhesive layer and a thermoplastic film have previously been laminated, wherein said at least one supplementary layer is chosen within the list consisting of a thermoplastic film, a hard coat layer, a primer layer, a tinting layer, a photochromic layer, a polarized layer, a liquid crystal-layer, an electro-chromic layer, an anti-static layer, an anti-reflective layer, a tinted layer, a selective filter for filtering one or more wavelength ranges, a top coat layer, an anti-smudge, an anti-fog layer, an anti-rain layer, a hydrophobic layer or a combination thereof.

10. The method for manufacturing as claimed in claim 6, wherein either the thermoplastic film or the pressure sensitive layer comprises a further optical property, by addition or presence of at least a dye, a pigment, an absorber, a photochromic dye.

11. The method for manufacturing as claimed in claim 6, wherein the spectacle lens is previously manufactured from a semi-finished spectacle lens to provide a receiving surface thanks to a machining process of the semi-finished spectacle lens which comprises at least one of roughing step and a fining step, and no more than two steps selected from a roughing step, a fining step and a roughness erasing step.

12. The method for manufacturing as claimed in claim 11, wherein the machining process of the semi-finished spectacle lens only comprises a roughing step.

13. The method for manufacturing as claimed in claim 6, wherein the said method for manufacturing comprises a preliminary step of providing a supplied spectacle lens comprising a convex and a concave optical surface facing each other, followed by a control step and by a decision making step wherein:
  the control step comprises determining the roughness of a surface of the supplied spectacle lens which is intended to be a receiving surface;
  the decision making step comprising following sub steps:
   i. comparing the previously determined roughness of said optical surface to the one of a receiving surface of a spectacle lens according to claim 6;
   ii. providing the supplied spectacle lens to the providing step of the method for manufacturing according to claim 6 if the roughness requirements of the spectacle lens of claim 6 are fulfilled and providing the supplied spectacle lens to a complementary step if the roughness requirements of the spectacle lens of claim 6 are not fulfilled.

14. The method for manufacturing as claimed in claim 13, wherein determining the roughness of a surface which is intended to be a receiving surface is implemented according to a method chosen in the list consisting of measuring the roughness of said surface; deducing the roughness of said surface on the basis of previous manufacturing data of said surface; comparing said surface with a surface of known roughness; deducing the roughness of said surface on the basis of the roughness of a sample surface manufactured previously using similar manufacturing data.

15. The method for manufacturing as claimed in claim 13, wherein the complementary step is chosen within the list of rejecting the supplied spectacle lens and further machining the surface which is intended to be a receiving surface so that the roughness of said surface fulfils the following roughness requirements:
  arithmetic average profile roughness, Ra, greater or equal to 0.01 μm and less or equal to 0.3 μm; and/or
  roughness root mean square slope, Rdq, greater or equal to 0.2° and less or equal to 1.2°; and/or
  mean spacing between peaks, called RSM, according to the following equation:

$$RSM \geq \min(0.64 \times Ra; 0.58 \times Ra + 0.007)$$

after said machining step in order to provide the supplied spectacle lens to the providing step of the method for manufacturing according to claim 6.

16. The optical article as claimed in claim 3, wherein the receiving surface has the mean spacing between peaks, called RSM, according to one of the following equations:

$$RSM \geq 0.64 \times Ra, \text{ or } RSM \geq 0.58 \times Ra + 0.007.$$

17. The optical device as claimed in claim 5, wherein the thickness of the pressure sensitive adhesive layer is greater than or equal to 25 μm and/or less than or equal to 75 μm, and the thickness of the thermoplastic film is greater than or equal to 80 μm and/or less than or equal to 200 μm.

* * * * *